United States Patent
Lin et al.

(10) Patent No.: US 7,463,769 B2
(45) Date of Patent: Dec. 9, 2008

(54) RADIOMETRIC CALIBRATION FROM A SINGLE IMAGE

(75) Inventors: Stephen S. Lin, Beijing (CN); Baining Guo, Beijing (CN); Heung-Yeung Shum, Beijing (CN); Jinwei Gu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/156,988

(22) Filed: Jun. 20, 2005

(65) Prior Publication Data

US 2006/0008141 A1 Jan. 12, 2006

Related U.S. Application Data

(63) Continuation-in-part of application No. 10/809,167, filed on Mar. 23, 2004.

(51) Int. Cl.
*G06K 9/00* (2006.01)

(52) U.S. Cl. .................. 382/169; 382/167; 382/168; 382/274; 382/171; 382/172; 358/521; 348/222.1; 348/362

(58) Field of Classification Search .............. 382/168, 382/169, 171, 172, 190, 199, 260, 274, 262, 382/167; 348/362, 222.1; 345/690–697
See application file for complete search history.

(56) References Cited

U.S. PATENT DOCUMENTS

| | | | | | |
|---|---|---|---|---|---|
| 4,663,591 | A | * | 5/1987 | Pelc et al. | .............. 324/309 |
| 5,568,571 | A | * | 10/1996 | Willis et al. | .............. 382/254 |
| 5,767,922 | A | * | 6/1998 | Zabih et al. | .............. 348/700 |
| 5,832,140 | A | * | 11/1998 | Stapleton et al. | .......... 382/298 |
| 6,208,753 | B1 | | 3/2001 | Braudaway et al. | |
| 6,437,823 | B1 | | 8/2002 | Zhang | |
| 6,608,926 | B1 | * | 8/2003 | Suwa et al. | .............. 382/162 |

(Continued)

FOREIGN PATENT DOCUMENTS

| EP | 0562971 | 9/1993 |
|---|---|---|
| EP | 1117070 | 7/2001 |

OTHER PUBLICATIONS

Barnard et al., "Camera Characterization for Colour Research" Colour research and Applications, vol. 27, No. 3, Jun. 2002, pp. 152-163.

(Continued)

*Primary Examiner*—Matthew C Bella
*Assistant Examiner*—Ali Bayat
(74) *Attorney, Agent, or Firm*—Lee & Hayes, PLLC

(57) ABSTRACT

Radiometric calibration of an image capture device (e.g., a digital camera) using a single image is described. The single image may be a color image or a grayscale image. The calibration identifies and analyzes edge pixels of the image that correspond to an edge between two colors or grayscale levels of a scene. Intensity distributions of intensities measured from the single image are then analyzed. An inverse response function for the image capture device is determined based on the intensity distributions. For a color image, the radiometric calibration involves calculating an inverse response function that maps measured blended colors of edge pixels and the associated measured component colors into linear distributions. For a grayscale image, the radiometric calibration involves deriving an inverse response function that maps non-uniform histograms of measured intensities into uniform distributions of calibrated intensities.

8 Claims, 12 Drawing Sheets

U.S. PATENT DOCUMENTS

| | | | |
|---|---|---|---|
| 6,639,594 | B2 | 10/2003 | Zhang et al. |
| 6,654,493 | B1 | 11/2003 | Hilliard et al. |
| 6,678,407 | B1 | 1/2004 | Tajima |
| 6,686,921 | B1 | 2/2004 | Rushmeier et al. |
| 6,825,884 | B1 * | 11/2004 | Horiuchi ............ 348/362 |
| 7,054,485 | B2 * | 5/2006 | Li et al. ............ 382/172 |
| 2005/0104974 | A1 | 5/2005 | Watanabe et al. |
| 2005/0134599 | A1 | 6/2005 | Nayar et al. |

OTHER PUBLICATIONS

Lin et al., "Radiometric Calibration from a Single Image" Proc. of IEEE Conference on Computer Vision and Pattern Recognition. vol. 2, Jun. 27, 2004, pp. 938-945.

Bruegge, et al, "MISR Prelaunch Instrument Calibration and Characterization Results", IEEE, Transactions on Geo Science and Remost Sensing, vol. 36, No. 4, Jul. 1998, pp. 1186-1198.

Campos, "Radiometric Calibration of Charge-Coupled-Device Video Cameras", Metrologia, vol. 37, No. 5, Oct. 2000, pp. 459-464.

Debevec, et al, "Recovering High Dynamic Range Radiance Maps from Photographs", Siggraph 97, Aug. 1997, pp. 1-3, 1-10.

Demircan, "Use of a Wide Angle CCD Line Camera for BRDF Measurements", Infrared Physics & Technology, vol. 41, No. 1, Feb. 2000, pp. 11-19.

Flynn, et al, "Radiometric Calibration Procedures for a Wideband Infared Scene Projector (WISP)", SPIE, vol. 3697, Apr. 1999, pp. 265-273.

Grossberg, et al, "What Can Be Known about the Radiometric Response from Images?", retrieved Mar. 23, 2004 at <<htty://www.springerlink.com/app/home/contribution.asp?wasp=n1dr7rf9be2xpm4aa3ay&r>>, Computer Vision—ECCV 2002: 7th European Conference on Computer Vision, May 28-31, 2002, pp. 1-2, 1-16.

Grossberg, et al, "What is the Space of Camera Response Functions?", IEEE, vol. II, Jun. 18-20, 2003, pp. 1-8.

Mann, et al, "On Being 'Undigital' with Digital Cameras: Extending Dynamic Range by Combining Differently Exposed Pictures", IS&T's 48th Annual Conference, May 1995, pp. 422-428.

Mann, et al, "Quantigraphic Imaging: Estimating the Camera Response and Exposures from Differently Exposed Images", IEEE, Dec. 2001, pp. 1, 1-8.

Marmelstein, et al, "Spectral and Radiometric Calibration of Midwave and Longwave Infrared Cameras", Society of Photo-Optical Instrumentation Engineers, Feb. 2000, pp. 347-352.

Mitsunaga, et al, "Radiometric Self Calibration*", IEEE, Computer Vision and Pattern Recognition, vol. 1, Jun. 23-25, 1999, pp. 1-8.

Nayar, et al, "High Dynamic Range Imaging: Spatially Varying Pixel Exposures", Proceedings of IEEE Conference on Computer Vision and Pattern Recognition, Jun. 2000, pp. 1-9.

Pauquet, "Bayesian Estimation", Bayesian Estimation Web, Oct. 2002, pp. 1-8.

Rasmussen, "The Infinite Gaussian Mixture Model", MIT Press, 2000, pp. 554-560.

Singh, et al, "Exploiting Spatial and Spectral Image Regularities for Color Constancy", MIT Computer Science and Artificial Intelligence Laboratory, Jul. 2003, pp. 1-19.

Tsin, et al, "Statistical Calibration of CCD Imaging Process", retrieved Mar. 23, 2004 at << http://www.ri.cmu.edu/pubs/pub_3742.html>>, IEEE, Jul. 2001, pp. 1-2, 1-8.

* cited by examiner

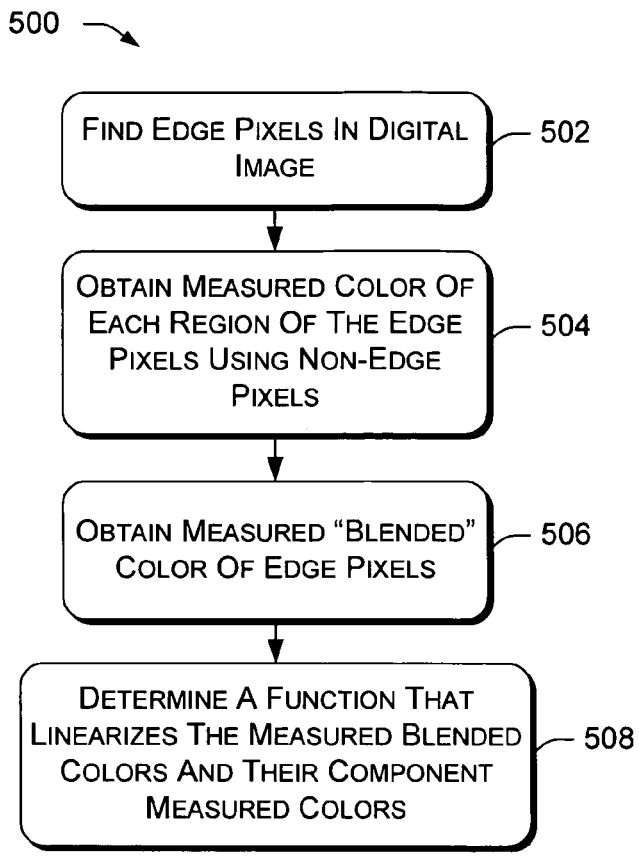
Fig. 5
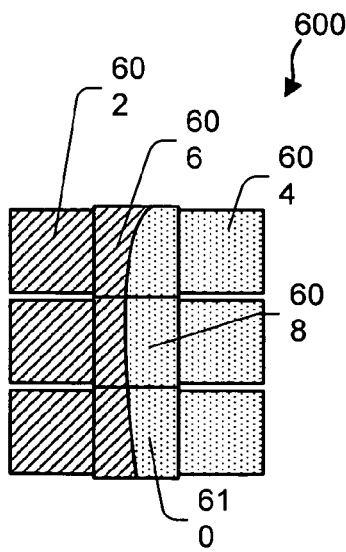
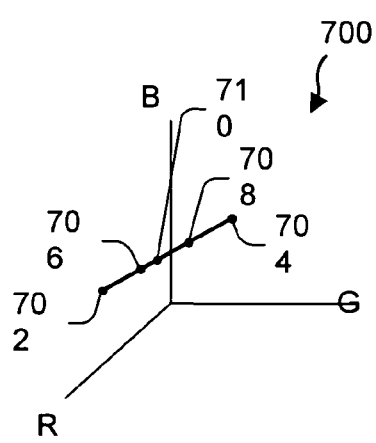
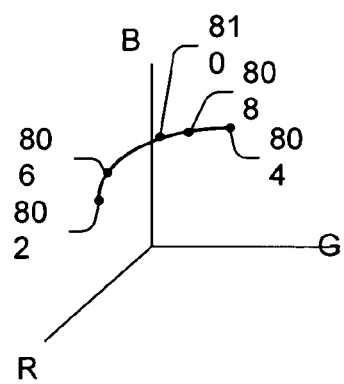
FIG. 6    FIG. 7    FIG. 8

RADIOMETRIC CALIBRATION FROM A SINGLE IMAGE

RELATED APPLICATION(S)

This is a continuation in part (CIP) of U.S. patent application Ser. No. 10/809,167, entitled "Radiometric Calibration from a Single Image", which was filed Mar. 23, 2004 and is assigned to Microsoft Corporation. This application is hereby incorporated by reference in its entirety.

BACKGROUND

In most digital cameras, there exists a nonlinear relationship between the image intensities output from the camera and the scene radiance that enters the camera. This nonlinearity is intentionally designed into digital cameras to compress the dynamic range of scenes and to account for nonlinearities in display systems. However, in some applications, it is desired to calibrate the digital camera (or other image capture devices) so that the intensities of the image will more accurately correspond to the scene radiance received by the camera.

FIG. 1 shows an example of a conventional system 100 for capturing an image of a scene 102 to produce a digital color image 104. The system 100 includes a digital camera 106 to capture the image of the scene 102 and output measured colors that are used to form the digital image 104. The digital camera 106 has a response function 108 that relates the colors of digital image 104 to the scene radiance from scene 102. This mapping of scene radiance to image intensity of colors is also referred to as the "radiometric response function". More particularly, radiance from a scene is recorded at the imaging array of a camera (e.g., a CCD array) as image irradiance. Irradiance values I are then transformed according to the camera's radiometric response $f$ into measured intensities M that are output from the camera:

$$M = f(I)$$

In general, the radiometric response function 108 is nonlinear and depends on the camera, typically varying from camera to camera. Further, the response function 108 can even be different for cameras that are the same model.

While the intentional nonlinear response function may be beneficial for viewing purposes, it impairs many computer vision methods which assume that image intensities are linearly related to scene radiance. A broad range of vision algorithms require linearity because precise measurements of scene radiance are needed for accurate processing. In photometric methods, such as shape from shading, color constancy, and illumination estimation, physical information is derived from scene radiance for analyzing a scene. Image intensities are also implicitly presumed to convey scene radiance in many other vision methods, such as object recognition and multi-camera stereo, so that images captured from different cameras or at different brightness levels can be properly compared.

To compensate for the nonlinear response function 108, camera 102 can be calibrated by finding an "inverse" of response function 108 so that, ideally, the measured colors will be mapped into colors exactly matching or linearly related to the scene radiance. There are conventional approaches to finding this inverse response function. In one approach, a user takes an image of a "reference" color scene (i.e., having regions of known color) so that the measured colors output by camera 102 can be compared to the actual colors. Thus, this type of approach requires an image of the "reference". In another approach, several images of a scene are required. The series of images are taken under various precisely known exposure settings, with all of the images being registered (i.e., taken with the positions of the camera and scene being unchanged).

However, these conventional solutions have shortcomings in that in some scenarios, neither a "reference" image captured by the camera nor a series of registered images with different exposure settings may be available. For example, in some scenarios, only a single image may be available, with no knowledge of the camera and the exposure setting used to capture the image. Moreover, some cameras that capture images in grayscale (e.g., relatively inexpensive surveillance cameras) do not permit exposure changes, and thus it is impossible to take a series of images at different exposure settings.

Accordingly, there is a continuing need for improved radiometric calibration techniques.

SUMMARY

Radiometric calibration of an image capture device (e.g., a digital camera) using a single image is described. The calibration techniques can be performed using a single color image or a single grayscale image. The radiometric calibration involves identifying edge pixels of the single image that correspond to an edge between two colors or grayscale levels of a scene. Intensity distributions of intensities measured in the edge regions of the single image are then analyzed and an inverse response function for the image capture device is determined based on the intensity distributions. For a color image, radiometric calibration involves calculating an inverse response function for the image capture device that maps measured blended colors of edge pixels and associated measured component colors into linear distributions. For a grayscale image, the radiometric calibration involves deriving an inverse response function for the image capture device that maps non-uniform histograms of measured intensities in the edge regions into uniform distributions of calibrated intensities. With the single-image approach, radiometric calibration can be performed in many instances where the image capture device is unknown.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

FIG. 5 is a flow diagram illustrating a radiometric calibration process for determining an inverse response function from a single color image, which may further represent operational flow of the color calibration system of FIG. 4.

FIG. 6 is a diagram illustrating edge pixels in an image, which are used in determining an inverse response function from a single color image.

FIG. 7 is a diagram illustrating the image irradiance of the edge pixels depicted in FIG. 6 in red-green-blue (RGB) color space.

FIG. 8 is a diagram illustrating the measured color of the pixels depicted in FIG. 6 in RGB color space.

DETAILED DESCRIPTION

The disclosure is directed to radiometric calibration of image capture devices, such as digital cameras, using a single image. The image may be a color image or a grayscale image. Moreover, from this single image, radiometric calibration can be performed in many instances where the image capture device is unknown.

The calibration process initially identifies edge pixels of a digital image that correspond to an "edge" between two colors or grayscale levels in a scene. In a color image, the edge pixels represent a blended color formed from two component colors as measured by the camera. The response function of the image capture device causes the measured blended color to be nonlinear with respect to its measured component colors. One implementation of the radiometric calibration process is to determine an inverse response function at least in part by finding edge pixels and then determining a function that maps the blended colors of edge pixels and the measured component colors into linear distributions. In this manner, for a color image, calibration involves calculating an inverse response function of a camera from a single digital image of a scene in which the actual colors of the scene are not known a priori.

In the case of a grayscale image, the edge pixels represent blended regions formed from two component gray levels as measured by the camera. The response function of the image capture device transforms irradiance values nonlinearly into intensity values that form a histogram with a non-uniform distribution. Another implementation of the radiometric calibration process is to determine an inverse response function from measured intensities in edge regions that maps non-uniform histograms of measured intensities into uniform distributions of calibrated intensities.

Multiple and varied implementations are described below. Initially, in the following section, a general calibration system and process are described. After this discussion, representative implementations of the calibration system and process for color images and for grayscale images are described in subsequent sections.

General Calibration System

Figure 2:
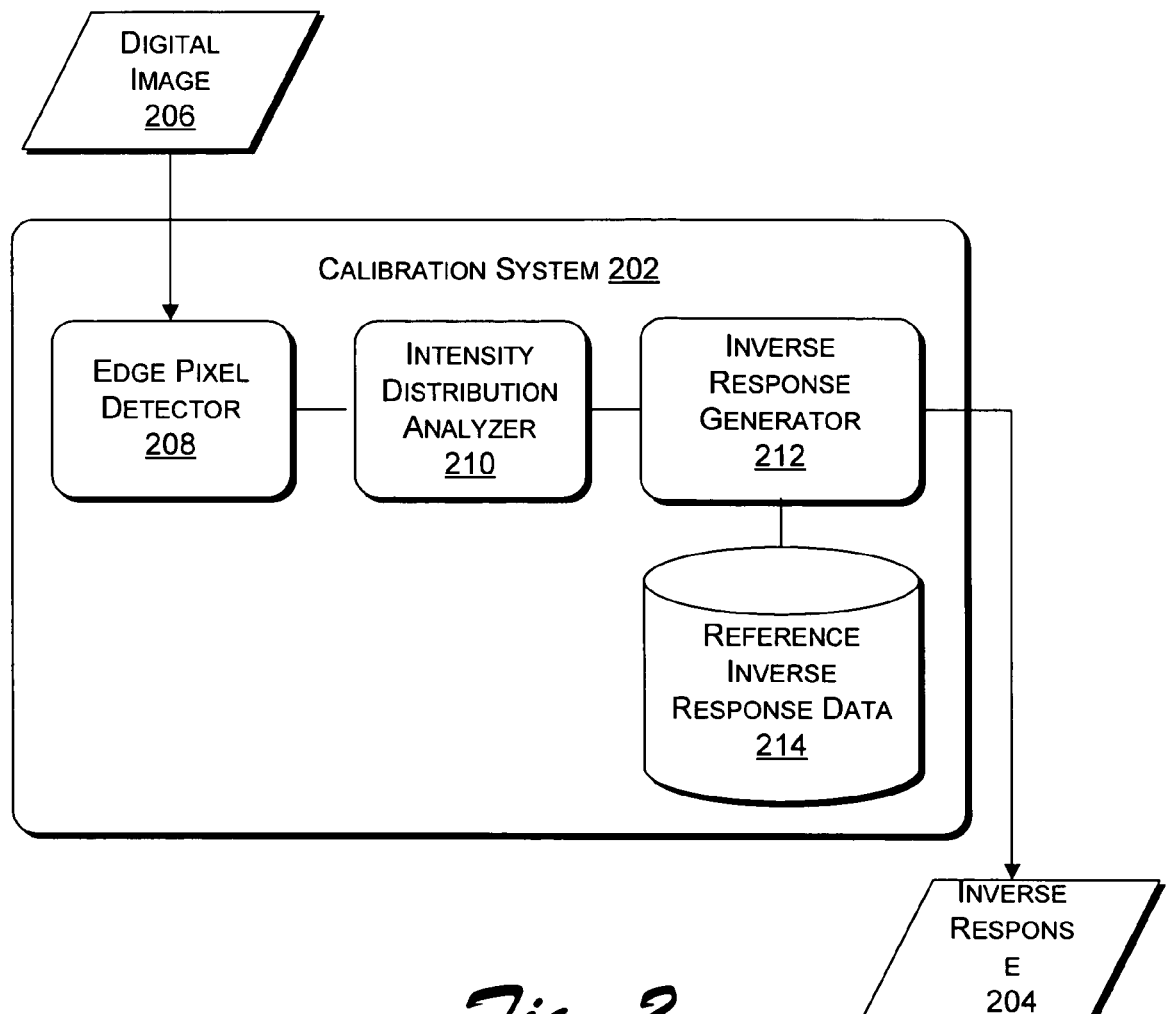
FIG. 2 is a block diagram of a radiometric calibration system capable of determining an inverse response function from a single image according to one implementation.

FIG. 2 illustrates an exemplary radiometric calibration system 202 that performs radiometric calibration from a single image. More particularly, system 202 is capable of determining an inverse response function 204 from a single image 206, which may be color or grayscale. In this example, system 202 includes an edge pixel detector 208, an intensity distribution analyzer 210, an inverse response generator 212, and a datastore 214. Some or all of the above-described elements of calibration system 202 can be implemented as software components in some implementations.

Edge pixel detector 208 is configured to find edge pixels in the single digital image 206. The edge pixels are located in edge regions of the image that exhibit intensity blending between two different radiance levels. The different radiance levels may be manifest, for example, as a blending of two different colors or of two areas of different gray levels. That is, for a color image, each pixel images one region having one color and another region having another color, so that each pixel represents a blended color derived from two colors. For a grayscale image, each pixel images one region having one gray level and another region having another gray level. Each pixel represents a blended gray level derived from the two gray levels.

Intensity distribution analyzer 210 is configured to analyze the intensity distribution produced from measured intensities of the pixels found by edge pixel detector 208. In the case of a color image, the intensity distributions are manifest in three-dimensional (3D) RGB color space as nonlinear distributions of measured edge colors. In the case of a grayscale image, the intensity distributions are manifest by non-uniform histograms of measured intensities in the edge regions.

Inverse response generator 212 is configured to estimate or generate an inverse response function that converts the measured intensities into calibrated intensities. In the case of the color image, the inverse response generator 212 computes an inverse response function that maps the nonlinear distributions of measured edge colors into linear distributions. In the case of the grayscale image, the inverse response generator 212 maps the non-uniform histograms of measured intensities into uniform distributions of calibrated intensities. In one implementation, the inverse response generator 212 may use reference inverse response data collected from several real cameras and stored in data store 214. One example collection of such data is the Database of Response Functions (DORF) as described in Grossberg, M. D. and Nayar, S. K., What is the Space of Camera Response Functions, Proc. *IEEE Comp. Vision and Pattern Recognition (CVPR '03)—Vol. II*, June 2003, pp. 602-609.

The inverse response function may then be used to correct for the radiometric response function in the image capture device that captured the digital image 206. With application of the inverse response function, intensities of the digital image will more accurately correspond to the scene radiance originally received by the image capture device.

Figure 3:
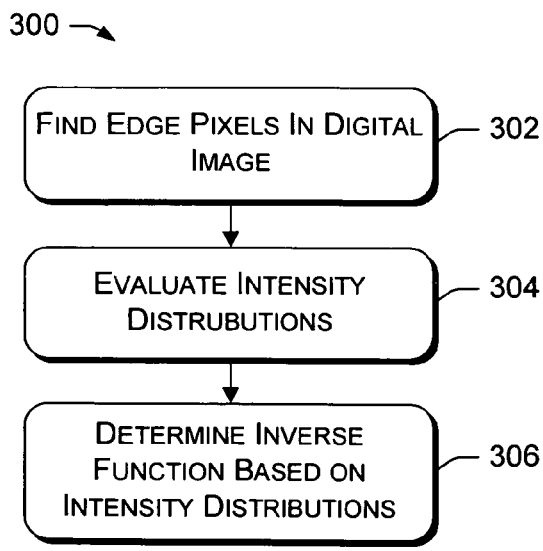
FIG. 3 is a flow diagram in a radiometric calibration process for determining an inverse response function from a single image.

FIG. 3 illustrates a process 300 for radiometric calibration using a single image. The process 300 (as well as other process described below) is illustrated as a collection of blocks in a logical flow graph, which represent a sequence of operations that can be implemented in hardware, software, or a combination thereof. In the context of software, the blocks represent computer instructions that, when executed by one or more processors, perform the recited operations. For discussion purposes, the process 300 is described with reference to the calibration system 202 shown in FIG. 2. It is noted that the process 300 may be implemented in other systems and architectures.

At block 302, edge pixels in the digital image are located. In one implementation, edge pixel detector 208 finds edge pixels in the image 206. Edge pixels are pixels that correspond to an edge between two regions of a scene that have different radiance values. Edge pixels have values that represent a blended result produced from two components. For instance, edge pixels in a color image have values that represent a blended color produced from two different component colors. For a grayscale image, the edge pixels have values representative of a composite gray level formed from the two component gray levels.

At block 304, the intensity distributions of the measured intensities of the located edge pixels are evaluated. In one implementation, intensity distribution analyzer 210 is configured to analyze the nonlinear distributions of measured edge colors and/or the non-uniform histograms of measured intensities along grayscale edges.

At block 306, an inverse response function is determined based on analysis of the intensity distributions. In one implementation, the inverse response generator 212 computes the inverse response function that maps nonlinear distributions of measured edge colors into linear distributions (in the case of a color image) and/or maps non-uniform histograms of measured intensities into uniform distributions of calibrated intensities (in the case of a grayscale image).

Specific cases of the calibration system and processes are described below in more detail. More particularly, a calibration system and accompanying process for radiometric calibration using a single color image is described in the next section with respect to FIGS. 4-12. After this color image scenario, a calibration system and process for radiometric calibration using a single grayscale image is described in a subsequent section with reference to FIGS. 13-18.

Radiometric Calibration from Single Color Image

Figure 4:
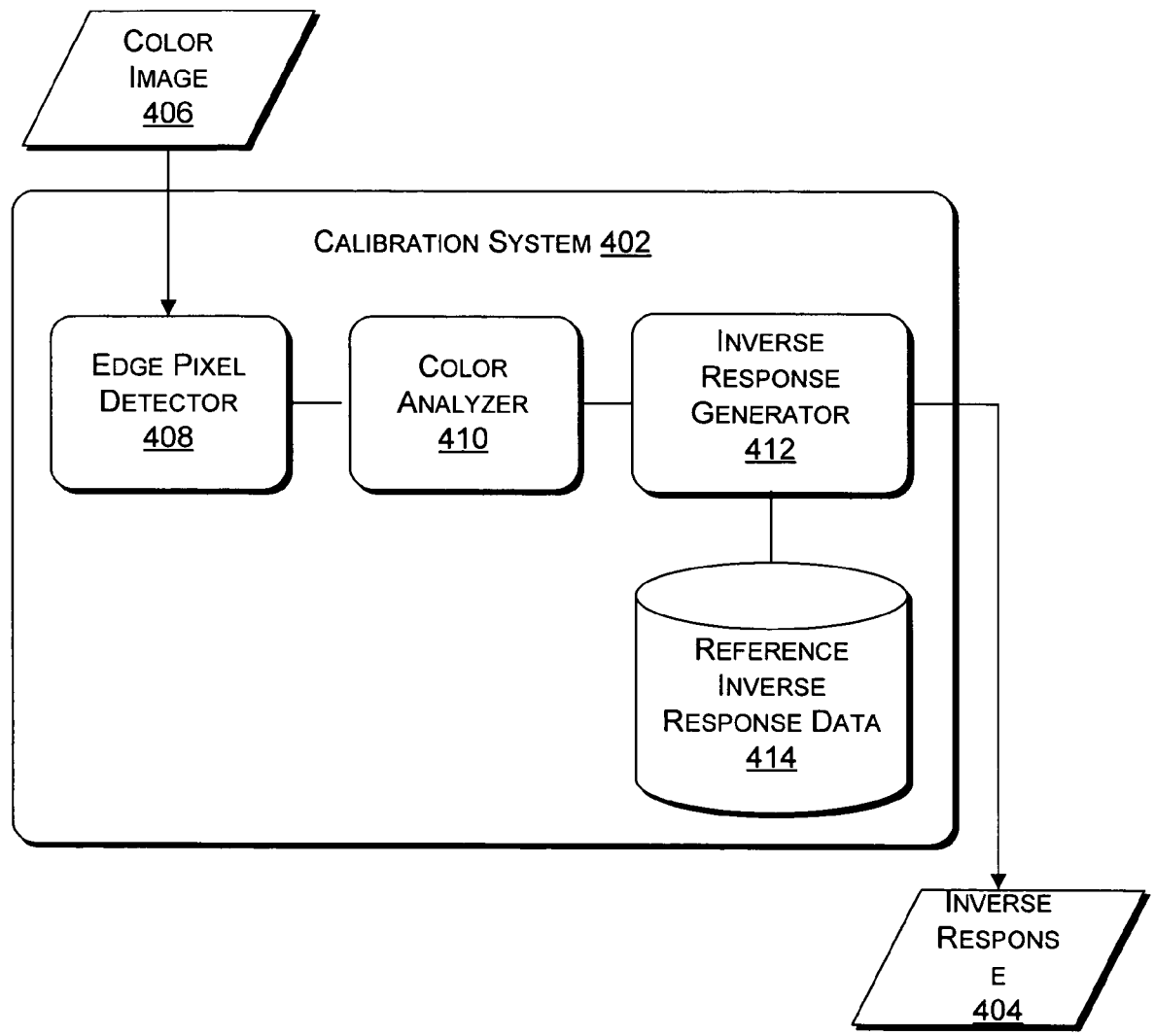
FIG. 4 is a block diagram of a calibration system capable of determining an inverse response function from a single color image, according to another implementation.

FIG. 4 illustrates a calibration system 402 capable of determining an inverse response function 404 from a single color image 406 according to one implementation. In this example, system 402 includes an edge pixel detector 408, a color analyzer 410, an inverse response generator 412, and a data store 414 that includes inverse response function data collected from several real cameras. This collection of inverse response data is also referred to herein as reference data. In one implementation, the inverse response function data comprises the Database of Response Functions (DORF) as described in Grossberg, M. D. and Nayar, S. K., What is the Space of Camera Response Functions, Proc. *IEEE Comp. Vision and Pattern Recognition (CVPR '03)—Vol. II*, June 2003, pp. 602-609. The above-described elements of calibration system 202 can be implemented as software components in some implementations.

Edge pixel detector 408 is configured to find edge pixels in a single digital color image 406. Each pixel images one region having one color and another region having another color. Each of these pixels represents a blended color derived from the two colors, and hence these two colors can be said to serve as component colors of the blended color.

In one implementation, edge pixel detector 408 includes a Canny edge detector (e.g., see Canny, J., A Computational Approach to Edge Detection, *IEEE Trans. Pattern Analysis and Machine Intelligence*, Vol. 8, No. 6, June 1986, pp. 679-698) to detect edge pixels. In other implementations, different edge detectors can be used.

Color analyzer 410 is configured to obtain measurements of the blended and component colors of the pixels found by edge pixel detector 408. Also, inverse response generator 412 is configured to generate the inverse response function 404 that maps the measurements of the blended and component colors of the found pixels into a linear distribution. One implementation of how calibration system 402 operates is described below in conjunction with FIG. 5 to determine the inverse response function.

FIG. 5 illustrates a process 500 for determining an inverse response function from a single color image, according to one implementation. This process 500 also provides an exemplary operational flow of calibration system 402 of FIG. 4.

Figure 1:
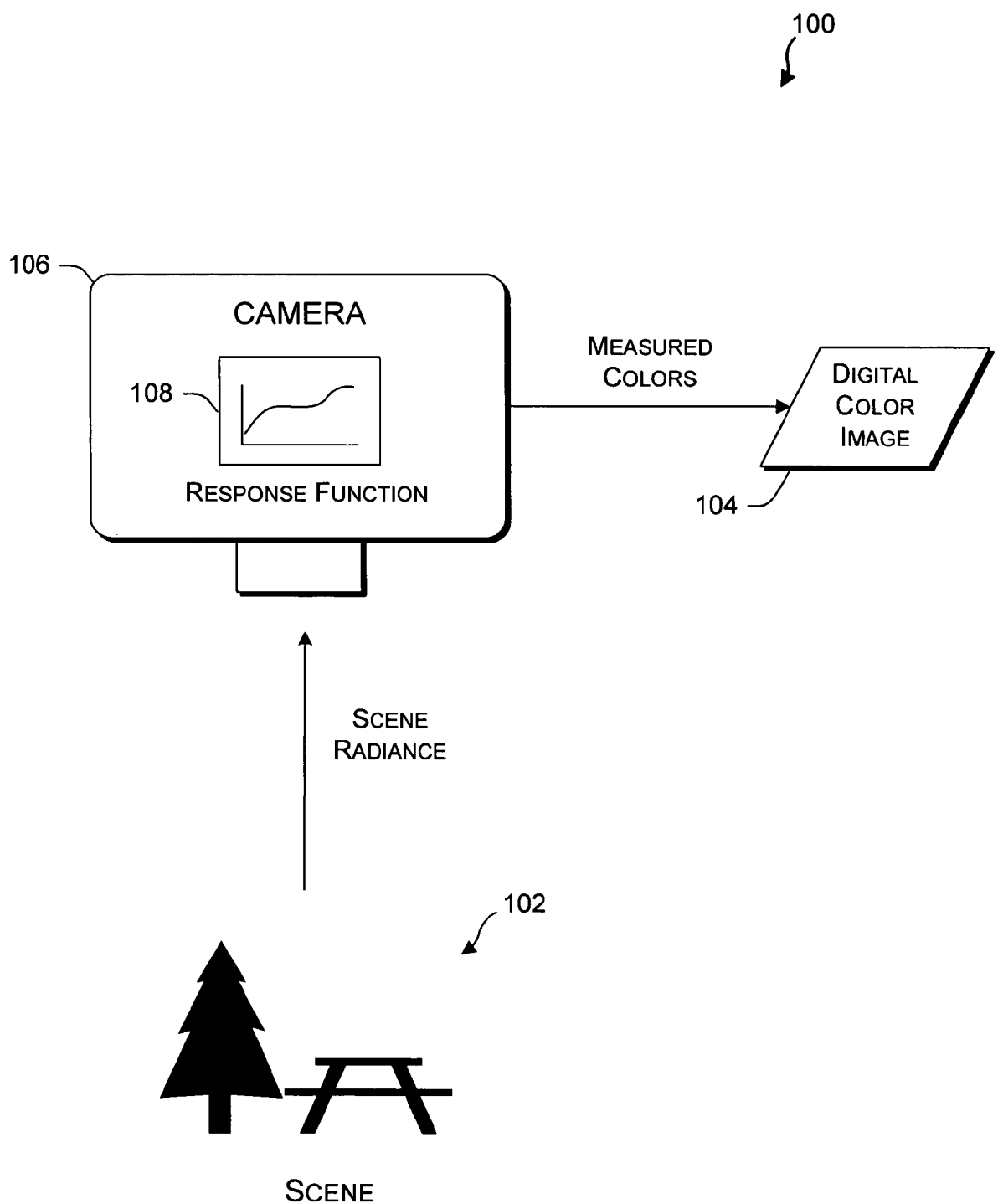
FIG. 1 (Prior Art) is a block diagram illustrating a camera taking a picture of a scene to produce a digital image.

At block 502, edge pixels in a digital color image are identified. In one implementation, edge pixel detector 408 of calibration system 402 finds edge pixels in digital image 404 to form an observation set. As previously described, edge pixels are pixels that correspond to an "edge" between two colors of a scene (such as scene 102 in FIG. 1). The edge pixels have values that represent a blended color formed from these two component colors, as measured by the camera.

FIG. 6 illustrates example edge pixels in a representative three-by-three patch 600 of pixels. A pixel 602 in the upper left hand corner of patch 600 has a uniform color, indicated by "diagonal line" shading (referred to herein as the first color). In addition, the two pixels in patch 600 directly beneath the pixel 602 have the same uniform first color. In contrast, a pixel 604 in the upper right hand corner of patch 600 has a different uniform color, which is indicated by "dot" shading (referred to herein as the second color). The two pixels directly below pixel 604 also have the same uniform second color. Pixels 606, 608, and 610 in the center column of patch 600 have regions of both the first and second colors and, thus, are referred to herein as edge pixels. The first and second colors are also referred to herein as component colors of edge pixel 606. Edge pixel 606 outputs a "blended" color formed from the combination of the first and second colors.

At block 504, the measured color of each region of the edge pixels is obtained. In this exemplary implementation, color analyzer 410 is configured to obtain the measured blended colors from each edge pixel using non-edge pixels having the same colors as the component colors in the edge pixels. For example, for edge pixel 606, color analyzer 410 can use the measured color of pixel 602 for the measured color of the first color region of edge pixel 606. Similarly, color analyzer 410 can use the measured color of pixel 604 for the measured color of the second color region of edge pixel 606.

Further, in this implementation, color analyzer 410 determines whether an edge pixel is suitable for use in determining an inverse response function. For example, in one implementation, color analyzer 410 determines whether: (a) the color variance (with respect Euclidean RGB distance) of the first and second colors are within a specified threshold (i.e., the first and second colors are sufficiently uniform); and (b) the mean colors of the first and second colors are at least a specified distance from each other (i.e., the first and second colors are separated enough to reduce the effect image noise). In addition, in this implementation, an edge region (also referred to herein as an edge window) that contains edge pixels that have a blended color outside of the range delimited by the first and second colors are ignored. In other implementations, color analyzer 410 can use different methods to obtain the measured colors of the component colors of the edge pixels.

At block 506, the measured colors of the edge pixels are obtained. In this implementation, color analyzer 410 is configured to obtain the measured blended color from each edge pixel. It can be shown that in the ideal case, a blended color will lie on a line segment connecting its component colors in RGB color space.

FIG. 7 shows an example of edge pixels of FIG. 6 being plotted in RGB space 700. A point 702 represents the color of pixel 602 in RGB space 700 and a point 704 represents the color of pixel 604 in RGB space 700. These colors are the component colors of the edge pixels in patch 600 (FIG. 6). A point 706 represents the color of edge pixel 606 in RGB color space 700; a point 708 represents the color of edge pixel 608 in RGB color space 700, and a point 710 represents the color of edge pixel 610 in RGB color space 700. As shown in FIG. 7, the colors of edge pixels 606, 608 and 610 (represented by points 706, 708 and 710, respectively) lie on a line segment connecting the colors of pixels 602 and 604 (represented by points 702 and 704, respectively).

However, in current commercially-available cameras, the measured colors of edge pixels are nonlinear with respect to their measured component colors. An example is shown in FIG. 8, where corresponding points representing pixels in patch 600 of FIG. 6 are plotted in RGB space 800. A point 802 represents the measured color of pixel 602 (FIG. 6) in RGB space 800, and a point 804 represents the measured color of pixel 604 (FIG. 6) in RGB space 800. These measured colors are the measured component colors of the edge pixels of patch 600 (FIG. 6). A point 806 represents the measured color of edge pixel 606 (FIG. 6) in RGB color space 800; a point 808 represents the measure color of edge pixel 608 in RGB color space 800, and a point 810 represents the measure color of edge pixel 610 in RGB color space 800. As shown in FIG. 8, the colors of edge pixels 606, 608, and 610 (represented by points 806, 808, and 810, respectively) lie on a curve segment (i.e., nonlinear) connecting the measured colors of pixels 602 and 604 (represented by points 802 and 804, respectively).

At block 508 (referring again to FIG. 5), a function is determined that linearizes the measured blended colors and their component colors. Said another way, the function maps the measured nonlinear measured colors into a linear distribution in RGB color space. In one implementation, color analyzer 410 determines a function g that linearizes the measured blended and measured component colors. Further, in one implementation, color analyzer 410 can be configured to normalize the domain and co-domain of linearizing function g so that g(0)=0 and g(1)=1 to account for scaling differences.

Further, in the implementation of FIG. 4, inverse response generator 412 then uses linearizing function g and reference data from datastore 414 to generate an inverse response function 404. In one implementation, the reference data is used to interpolate and extrapolate linearizing function g over intervals of incomplete color data. In an alternative implementation, linearizing function g can be used as the camera's inverse response function, so that inverse response generator 412 and datastore 414 need not be implemented. One implementation of the operational flow in determining the inverse response function is described below in conjunction with FIG. 11. In this way, calibration system 402 can advantageously find an inverse response function from a single image. Further, the actual scene colors need not be known a priori. Thus, calibration system 402 does not require the camera, or multiple images captured by the camera, or any knowledge of the exposure settings used to capture the image, to find an inverse response function.

Although the above operational flow is described sequentially in conjunction with FIG. 5, in other implementations, operations may be performed in different orders and/or in parallel.

Figure 9:
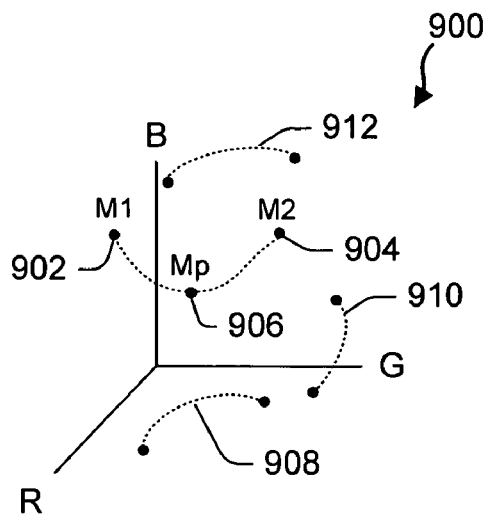
FIG. 9 is a diagram illustrating a measured color of an example edge pixel and measured colors of its component colors, in RGB space.
Figure 10:
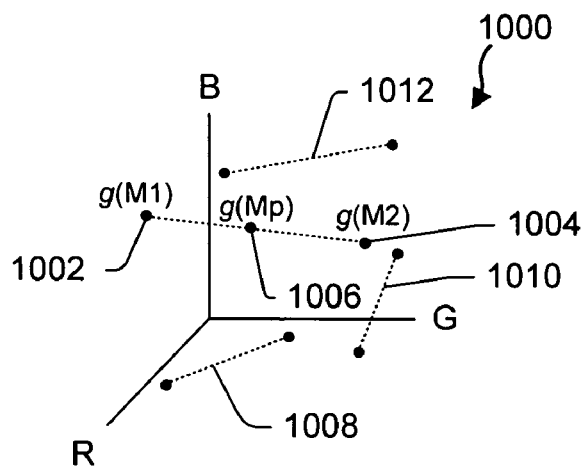
FIG. 10 is a diagram illustrating the resulting distribution after transforming the measured colors depicted in FIG. 9 using an inverse response function.

FIGS. 9 and 10 graphically illustrate a simplified example of linearizing the measured edge pixel colors. In FIG. 9, an RGB space 900 has a point 902 that represents the measured color of one component color of an edge pixel (also referred to as M1). A point 904 represents the measured color the other component color (also referred to as M2) of the edge pixel in RGB space 900. A point 906 represents the measured blended color of the edge pixel (also referred to as Mp). As can be seen in FIG. 9, a curve connects points 902, 904, and 906 due to the nonlinear response function of the camera used to capture the scene. Curves 908, 910, and 912 represent the distribution of measured colors of other edge pixels having different component colors than those of the measured blended color (Mp) represented by point 906. In a typical image, there would be many more such curves, but only these few are shown in FIG. 9 to avoid cluttering the figure.

As described above, color analyzer 410 then determines a function that linearizes the measured blended colors and the measured component colors. Ideally, the function maps the measured colors associated with each edge pixel (i.e., the measured component colors and the measured blended color) into a line segment.

An example is shown in FIG. 10, with the linearizing function referred to as function g. In RGB space 1000, a point 1002 represents the color of point 902 (FIG. 9) after transformation by linearizing function g. Stated another way, point 1002 represents the color in RGB color space of the measured component color (i.e., M1) after application of linearizing function g; i.e., g(M1). Similarly, a point 1004 represents the color in RGB color space of the other measured component color (i.e., M2) after application of linearizing function g; i.e., g(M2). A point 1005 represents the color in RGB color space 1000 of the measured blended color (Mp) after transformation by linearizing function g; i.e., g(Mp). As shown in FIG. 10, the transformed measured colors M1, Mp and M2 (represented by points 1002, 1006 and 1004, respectively) lie on a line segment. Similarly, curves 908, 910, and 912 of FIG. 9 are, ideally, transformed by linearizing function g into line segments 1008, 1010, and 1012, respectively.

Figure 11:
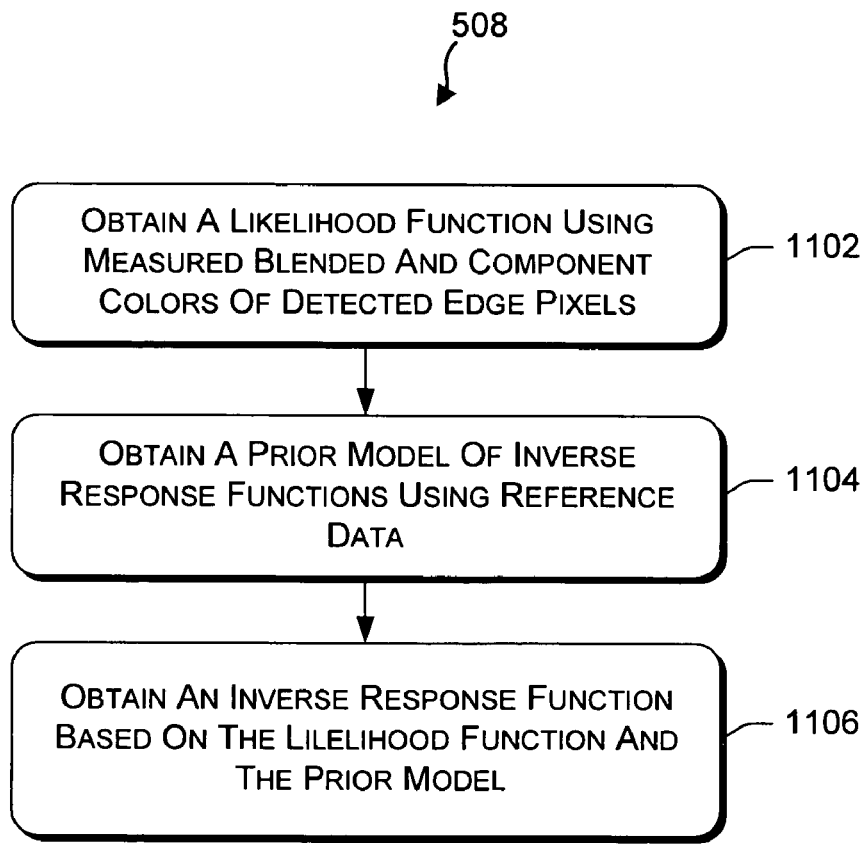
FIG. 11 is a flow diagram illustrating in more detail one aspect of operational flow depicted in FIG. 5 to determine a function that linearizes the measured blended colors.

FIG. 11 one implementation of the function determination operation 508 (FIG. 5) for determining a function that linearizes the measured blended colors. In other implementations, different approaches may be used to determine a linearizing function. The process 508 is described with reference to the calibration system 402 of FIG. 4.

At block 1102, a likelihood function is obtained using the measured blended colors and their corresponding measured component colors. In the exemplary implementation, color analyzer 410 obtains this function. More particularly, in this implementation, color analyzer 410 obtains the likelihood function based on the distance of each mapped blended color (Mp) to a line segment connecting its corresponding mapped component colors (M1 and M2). The Mp, M1 and M2 of an edge pixel are also referred to herein as an edge pixel triple. The distance of a mapped blended color, d(Mp), to the line segment that connects the blended color's mapped component colors can be determined from an edge pixel triple using equation 1 below.

$$d(Mp) = \frac{\|[g(M1) - g(M2)] \times [g(Mp) - g(M2)]\|}{|g(M1) - g(M2)|} \quad (1)$$

where × is the cross product operation between two vectors.

The sum of the distances of each mapped blended color, $D(g; \Omega)$, can be determined using equation 2 below.

$$D(g; \Omega) = \sum_\Omega \frac{\|[g(M1) - g(M2)] \times [g(Mp) - g(M2)]\|}{|g(M1) - g(M2)|} \quad (2)$$

where $\Omega$ is a set of edge pixel triples corresponding to the edge pixels previously found in block 502 (FIG. 5). In some alternative implementations, equation 2 can be minimized to determine an inverse response function without using reference data. For example, equation 2 can be minimized using constraints that the resulting equation be both smooth and monotonic. However, in this implementation, reference data is used to determine an inverse response function using Bayesian estimation techniques.

Bayesian estimation techniques can use prior models and likelihood functions to determine a posterior distribution. In this implementation, because the sum of distances is to be minimized, the likelihood function is formed by modeling the likelihood of an edge pixel triple $\Omega$ given an inverse response function g (i.e., $p(\Omega|g)$) as an exponential distribution using equation 2. Thus, this likelihood function can be defined using equation 3 below.

$$p(\Omega \mid g) = \frac{1}{Z} \exp(-\lambda D(g; \Omega)) \quad (3)$$

where Z is a normalization constant and $\lambda$ is set empirically to $10^4$. In other implementations, different values for $\lambda$ can be used.

At block 1104, a prior model is obtained using the reference data from datastore 414. In this implementation, inverse response generator 412 obtains a prior model by performing Principal Component Analysis (PCA) transformation on the aforementioned DoRF (i.e., the reference data) using five components (see e;g., Jollife, I. T., Principal Component Analysis, Springer Verlag, 1986). In one implementation, inverse response generator 412 represents the reference data in terms of the first five principal components, as shown in equation 4 below.

$$g = g_0 + cH \quad (4)$$

where $g0 = [g_{R0}, g_{G0}, g_{B0}]^T$ which is the mean inverse response; H is the matrix whose columns are composed of the first N=5 eigenvectors; and $c = [c_R, c_G, c_B]^T$ which is a coefficient vector in $R^{3 \times N}$ that represents an inverse response function $g = [g_R, g_G, g_B]^T$.

The inverse response generator 412, in this implementation, then obtains the model by of the inverse response functions by forming a finite Gaussian mixture model (see e.g., McLachlan, G. J. and Basford, K. E., Mixture Models, Marcel Dekker, 1988) from the reference data in PCA form, as shown in equation 5.

$$p(g) = \sum_{i=1}^{K} \alpha_i \eta(g; \mu_i, \Sigma_i) \quad (5)$$

where the parameters $\alpha_i$ are the mixing proportions and $\eta(g; \mu_i, \Sigma_i)$ are the normalized Gaussians of g. K is set equal to 5 in one implementation, which was obtained empirically by using the expectation maximum (EM) algorithm (see e.g., Dempster, A. P., Laird. N. M. and Rubin, D. B. (1977) Maximum Likelihood from Incomplete Data via the EM algorithm (with Discussion), JRSS(B), Vol. 39, pp. 1-38).

In other implementations, the model of equation 4 may be pre-computed using suitable custom or commercially-available PCA and EM algorithm tools and stored in datastore 414. In other implementations, different techniques can be used to obtain the prior model.

At block 1106, an inverse response function is obtained using the above likelihood function and prior model. In this implementation, inverse response generator 412 obtains the inverse response function. The optimal inverse response function g* is obtained by finding the maximum probability of the posterior distribution. The posterior distribution is defined in Bayesian estimation as the product of the prior model and the likelihood function. Thus, the optimal inverse response function g* can be found using equation 6 below, which is the maximum a posteriori (MAP) solution.

$$g^* = \arg\max p(\Omega|g)p(g) \quad (6)$$

where $p(\Omega|g)$ and $p(g)$ are given as equations 3 and 5, respectively.

By taking the log of equation 6, g* can also be written as equation 7 below.

$$g^* = \arg\min \lambda D(g;\Omega) - \log p(g) \quad (7)$$

which, in this implementation, is computed by the Levenberg-Marquardt optimization algorithm (see e.g., Press, W. H., Teukolsky, S. A., Vetterling, W. T., Flannery, B. P., Numerical Recipes in C, Cambridge University Press, 1992), with the coefficients of g being initialized to zero. In other implementations, different optimization algorithms can be used to find g*. In one implementation, after the optimization algorithm converges, the result is refined sequentially in each dimension using a greedy local search (see e.g., Resende, M. G. C. and Ribeiro, C. C., Greedy randomized adaptive search procedures, in Handbook of Metaheuristics, F. Glover and G. Kochenberger, eds., Kluwer Academic Publishers, pp. 219-249, 2003).

Although the above operational flow is described sequentially in conjunction with FIG. 11, in other implementations, operations may be performed in different orders and/or in parallel.

Figure 12:
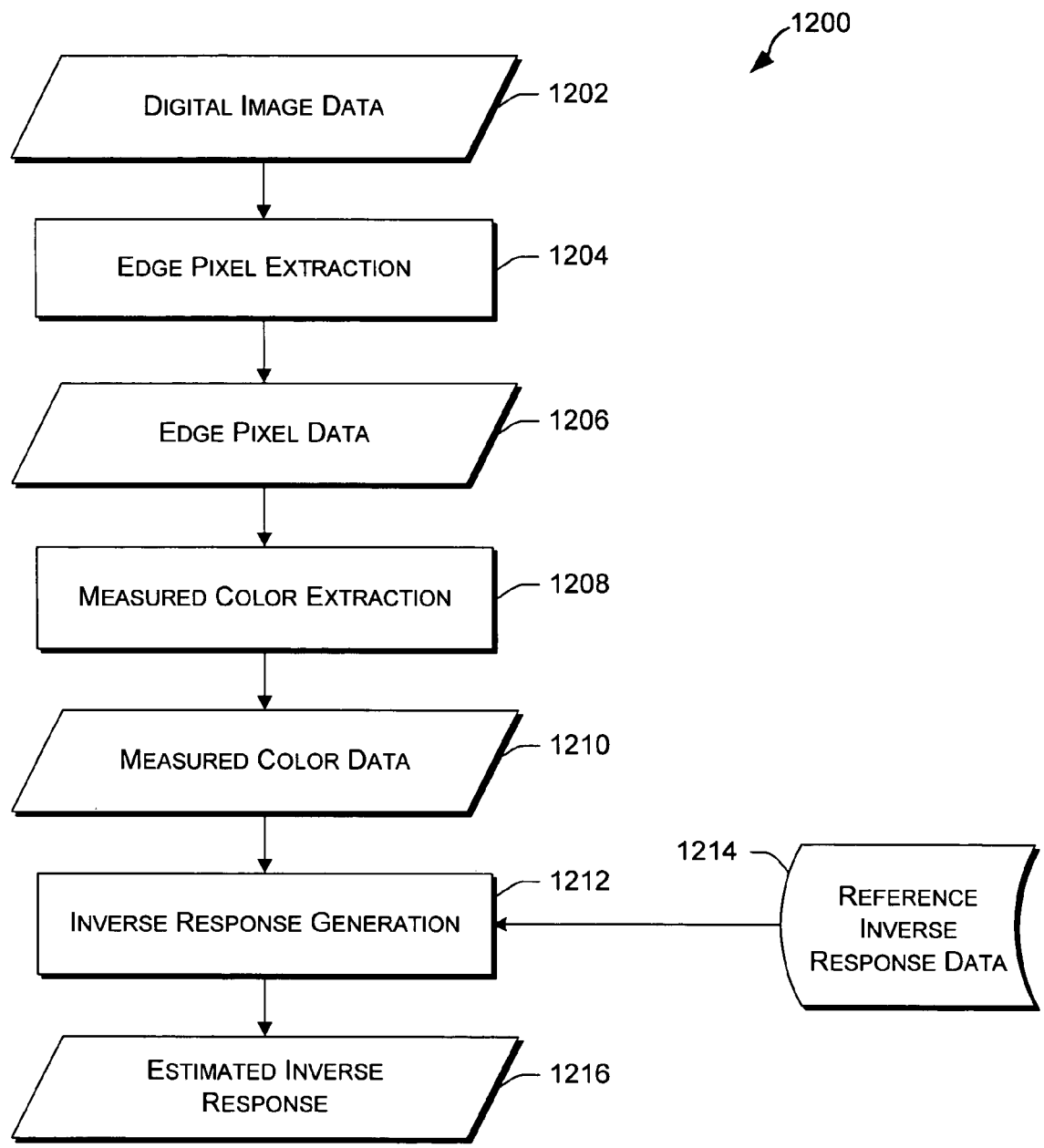
FIG. 12 is a data flow diagram illustrating data flow in determining an inverse response function from a single color image.

FIG. 12 illustrates a data flow 1200 in calibration system 402 (FIG. 4), according to one implementation. Image data received from a camera flows through and is processed so that colors of the image can be adjusted, according to one implementation as follows. Digital image data 1202 is received by an edge pixel extraction process 1204. In one implementation, for example, edge detector 408 of calibration system 402 performs edge pixel extraction process 1204 on digital image data 1202 as described above in conjunction with block 502 (FIG. 5). Edge pixel extraction process 1204 outputs edge pixel data 1206, which identifies edge pixels that are suitable for further processing (e.g., the edge pixels whose edge window exhibits sufficient uniformity and separation of component colors).

A measured color extraction process 1208 is performed on edge pixel data 1206. In one implementation, for example, color analyzer 410 (FIG. 4) performs color extraction process 1208 on edge pixel data 1206 to obtain the measured colors as described above in conjunction with blocks 504 and 506 (FIG. 5). Measured color extraction process 1208 outputs measured color data 1210. In one implementation, edge pixel data 1206 comprises the aforementioned set $\Omega$ of edge pixel triples.

An inverse response generation process 1212 is then performed on measured color data 1210. In one implementation, for example, inverse response generator 412 (FIG. 4) performs inverse response generation process 1212 using reference data 1214. In some alternative implementations, inverse response generator 412 need not use reference data 1214. Reference data 1214 comprises inverse response data from real cameras and, in one example implementation, is retrieved from datastore 414 (FIG. 4). Inverse response generation process 1212, in one implementation, is performed as described above in conjunction with block 508 and outputs an estimated inverse response 1216. In one implementation, inverse response generation process 1212 uses Bayesian estimation techniques as described in conjunction with blocks 1102, 1104, and 1106 (FIG. 11) to determine estimated inverse response 1216. Estimated inverse response 1216 can then be used to transform digital image data 1202 to produce an image with colors that more closely match the radiance of the captured scene.

Although the above data flow is described sequentially in conjunction with FIG. 12, in other implementations, processes may be performed on the data in different orders and/or in parallel. Further, the processes of FIG. 12 may be performed by any suitable system or component, in addition to system 402 (FIG. 4) as in the above description.

Radiometric Calibration From Single Grayscale Image

In addition to color images, radiometric calibration can be achieved from a single grayscale image. Grayscale images are black-n-white images that utilize a continuum of gray levels ranging from all white to all black. Grayscale images are popular in artistic photography and are commonly used in vision applications, such as face recognition and tracking in surveillance video.

The above described color-based approach to radiometric calibration is not directly applicable to grayscale images. Unlike color which can be measured as a vector of three spectral elements, grayscale intensities are scalar quantities for which properties such as linearity and nonlinearity do not apply. Thus, where the color approach described above takes advantage of how region blending constrains the values of irradiance to form linear distributions in RGB space and how a response function transforms these values into a nonlinear configuration, this sort of nonlinear shape deformation cannot occur for scalar grayscale values which are confined to a one dimensional (1D) line. Accordingly, to achieve radiometric calibration from a single grayscale image, a 1D analogue of the 3D color approach is used. Similar to the color approach, the formation of edge irradiance distributions from region blending are considered. But, since a nonlinear response function does not transfigure the locus of 1D grayscale values as it does for 3D colors, the grayscale approach employs higher-order distribution features along image edges to extract radiometric response information. More specifically, radiometric calibration from a single grayscale image capitalizes on a statistical feature of the frequency of irradiance values that arises from region blending. Thus, rather than looking at the values of irradiance, the grayscale approach employs frequency of irradiance values as represented by histograms of measured intensities.

Generally, the radiometric calibration technique for a single grayscale image derives a radiometric inverse response function from histograms of measured intensities at edge regions. Region blending at edges leads to statistical uniformity of irradiance histograms. Sensor nonlinearities map these irradiance distributions into non-uniform histograms of measured intensities output by the camera. From these measured intensity histograms, an inverse response function can be determined as the transformation that "un-skews" the distributions.

Figure 13:
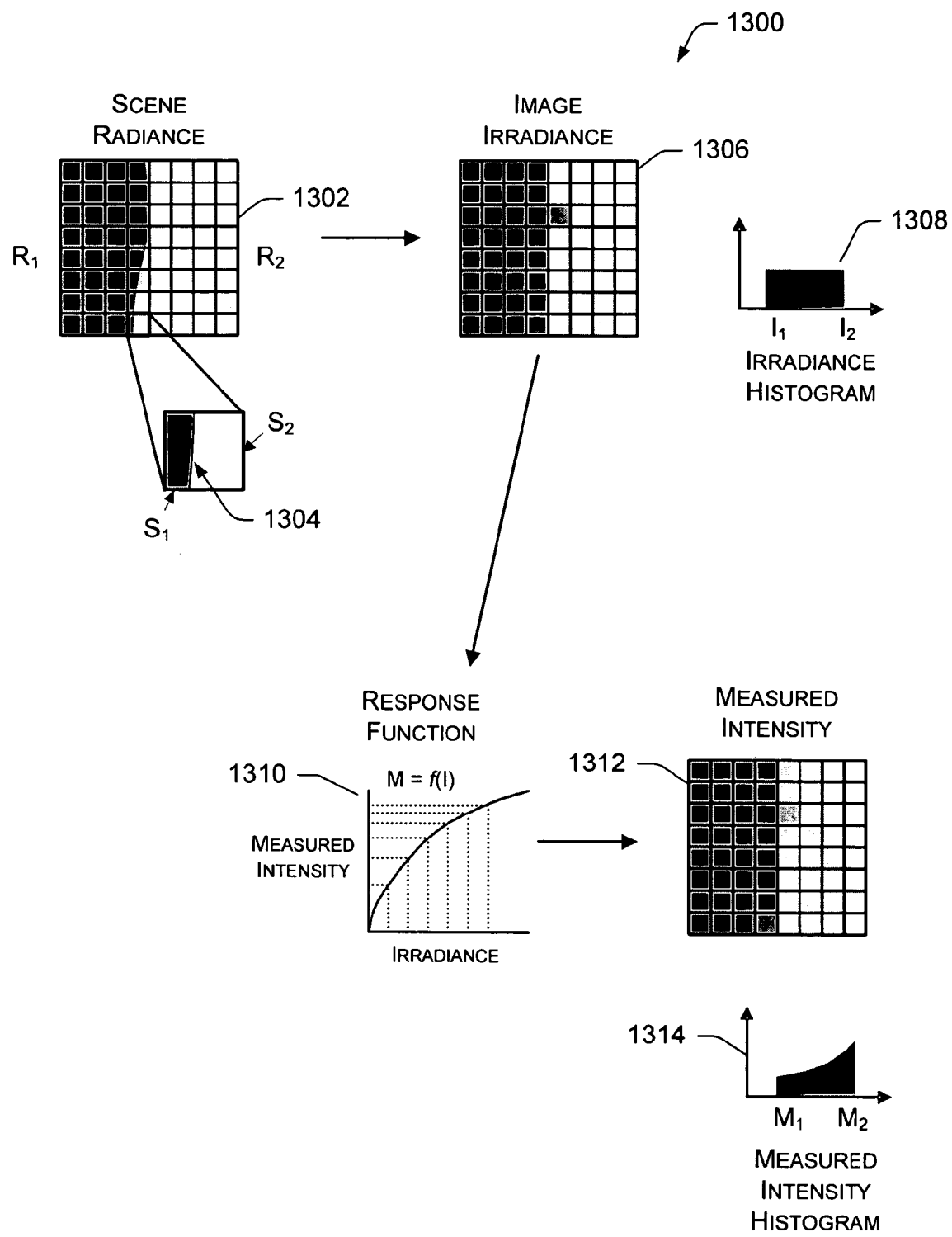
FIG. 13 is a conceptual illustration that demonstrates how region blending at grayscale edges leads to statistical uniformity of irradiance histograms.

FIG. 13 shows a conceptual illustration 1300 to demonstrate how region blending at edges leads to statistical uniformity of irradiance histograms. A portion of an image 1302 of a scene has an edge 1304 traversing there through. (An 8×8 pixel block structure is overlaid on the image to aid in understanding the concept.) The edge 1304 is bounded by two regions having different scene radiances $R_1$ and $R_2$. A pixel 1306 straddles the edge and receives radiance from both regions in proportion to areas $S_1$ and $S_2$ that it images of each region. Images are formed on a CCD sensor array that records radiance from the scene. Each imaging element records a single grayscale value as image irradiance, as represented by the 8×8 pixel block 1306. Since the proportion between $S_1$ and $S_2$ in an edge pixel is a uniform random variable (i.e., any grayscale value between 0 and 1 is equally probable), a histogram of irradiance values 1308 is uniform (not including irradiance values of bounding regions).

From the imaging array to the output image, the irradiance values undergo transformations represented by the camera's radiometric response function 1310. The camera's response function 1310 nonlinearly maps irradiance values to measured intensities. Due to the nonlinear function, the irradiance values are converted into measured intensity values (represented by pixel block 1312) that form a histogram 1314 of non-uniform distribution. Thus, to determine an inverse response function from measured intensities in edge regions, a function that maps non-uniform histograms of measured intensities into uniform distributions of calibrated intensities is computed.

Figure 14:
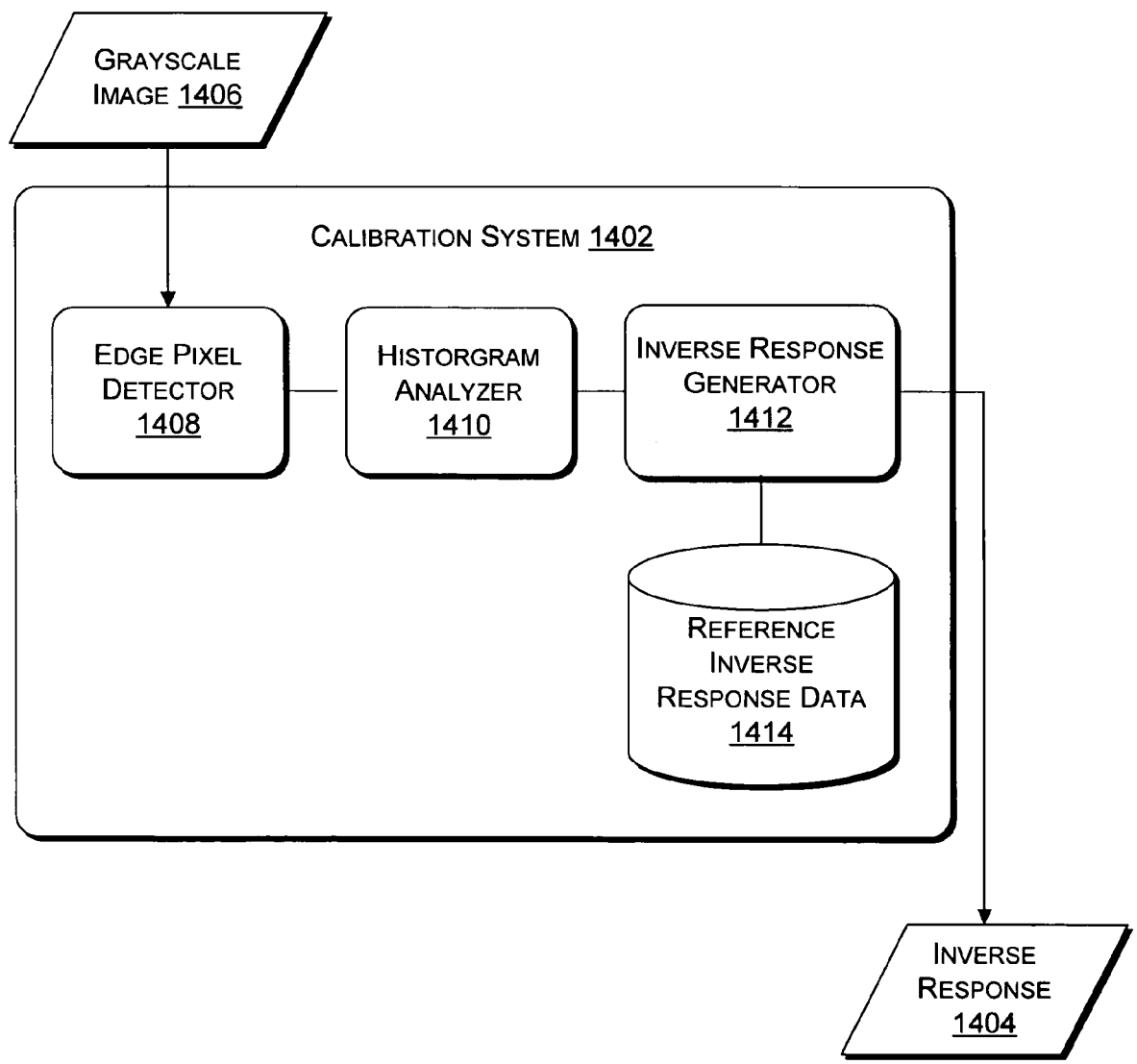
FIG. 14 is a block diagram of a radiometric calibration system capable of determining an inverse response function from a single grayscale image according to yet another implementation.

FIG. 14 illustrates an exemplary radiometric calibration system 1402 that performs radiometric calibration from a single grayscale image. More particularly, system 1402 is capable of determining an inverse response function 1404 from a single grayscale image 1406. In this example, system 1402 includes an edge pixel detector 1408, a histogram-based analyzer 1410, an inverse response generator 1412, and a datastore 1414. The datastore 1414 includes inverse response function data collected from several real cameras, such as the Database of Response Functions (DoRF) as described in Grossberg, M. D. and Nayar, S. K., What is the Space of Camera Response Functions, Proc. *IEEE Comp. Vision and Pattern Recognition (CVPR '03)—Vol. II*, June 2003, pp.

602-609. The above-described elements of calibration system 1402 can be implemented as software components in some implementations.

Edge pixel detector 1408 is configured to find edge pixels in the digital grayscale image 1406. The edges are located in image regions that exhibit intensity blending between two areas of uniform gray levels. Each pixel images one region having one gray level and another region having another gray level. Each pixel represents a blended gray level derived from the two gray levels that serve as component gray levels of the blended gray level.

Histogram analyzer 1410 is configured to analyze the uniformity of the measured intensity histogram produced from the measured intensities of the pixels found by edge pixel detector 1408. Inverse response generator 1412 is configured to estimate or generate an inverse response function that maps the non-uniform histograms of measured intensities into uniform distributions of calibrated intensities.

Figure 15:
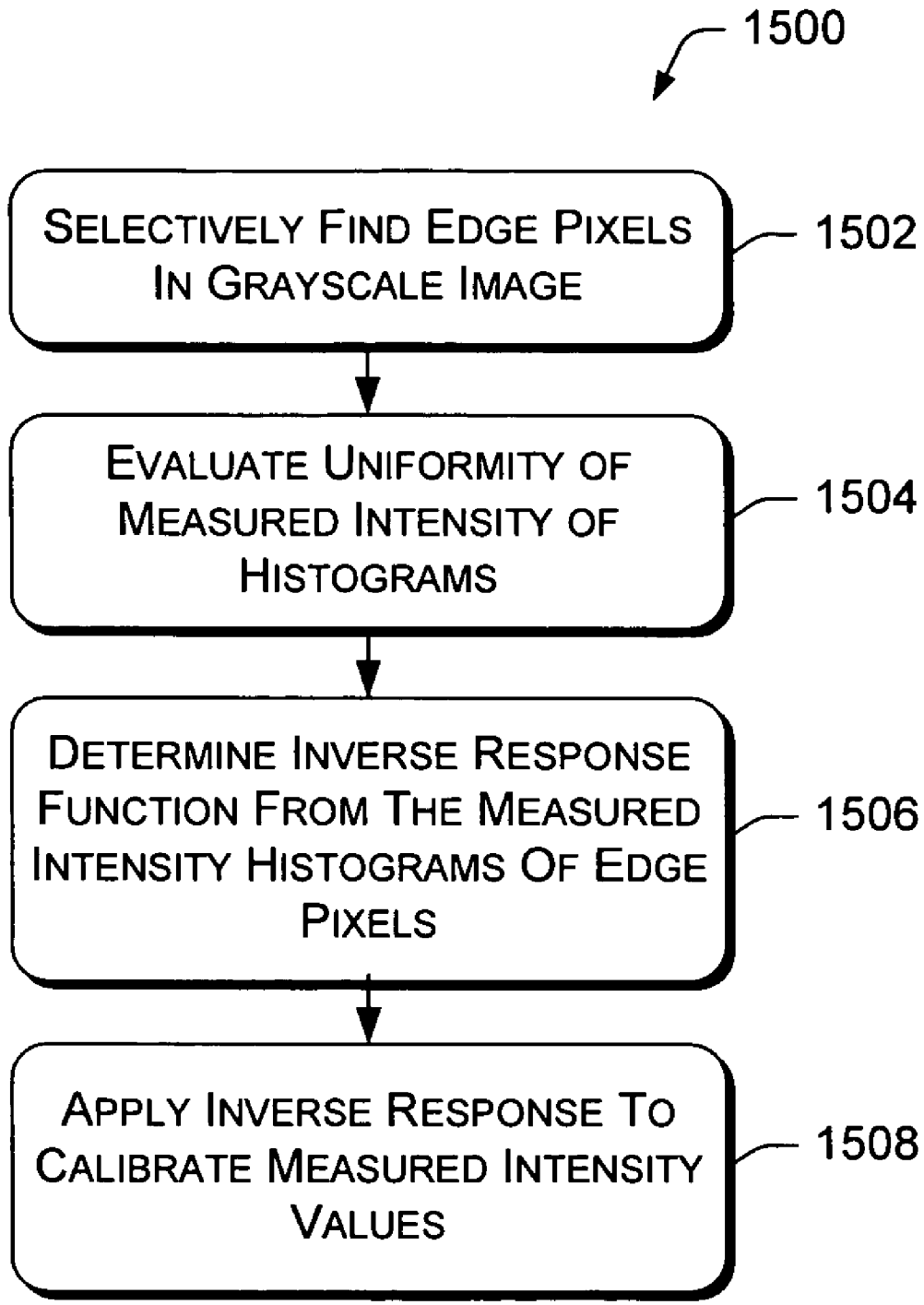
FIG. 15 is a flow diagram illustrating a radiometric calibration process for determining an inverse response function from a single grayscale image, which may further represent operational flow of the color calibration system of FIG. 14.

FIG. 15 illustrates a process 1500 for radiometric calibration using a single grayscale image. The process is described with reference to the exemplary system 1402 shown in FIG. 14, although the process may be implemented in other systems.

In block 1502, edge pixels in the grayscale image are located. In one implementation, edge pixel detector 1408 finds edge pixels in grayscale image 1406. As previously described, edge pixels are pixels that correspond to an "edge" between two regions of a scene that have different radiance values. One example edge pixel is shown as pixel 1304 in FIG. 13. The edge pixels have values that represent a blended gray levels formed from the two component gray levels as measured by the camera. In one particular configuration, the edge pixel detector 1408 identifies non-overlapping, fixed-size (e.g., 15×15) image windows that have desired blending characteristics. Valid windows are centered on a Canny-detected edge (see reference to Canny edge detector above) whose path divides the window into exactly two regions. The edge path is dilated by three pixels, and the intensity variances of the two partitioned non-edge regions are computed. If the variances of both regions lie below a specified threshold, the regions are considered uniform. Additionally, the edge intensities lie between the gray levels of the two bounding regions, because of the monotonicity of response functions. This helps to exclude some edges that exhibit artifacts such as JPEG ringing and chromatic aberration.

For greater robustness of the statistical non-uniformity measure, valid edge windows are aggregated into larger edge regions to increase the number of pixel samples in a histogram. This is performed by fusing adjacent or approximately adjacent windows that have corresponding region intensities.

There exist some cases, such as perfectly vertical or horizontal edges with respect to the CCD array, where an edge region may have an irradiance distribution that is not uniform. Undesirable edge regions caused by chromatic aberration may also be inadvertently included in the observation set, since the presence of this artifact is sometimes not apparent in a grayscale image. To reduce the number of such unfavorable histograms in the observation set, certain edge regions whose intensity histograms do not exhibit a skew that is characteristic of most response functions can be rejected. Since practically all common response functions skew uniform irradiance histograms towards brighter intensities, we detect outlier intensity histograms as those that do not generally display this form.

In a block 1504, the uniformity of the measured intensity histograms is evaluated. In one implementation, histogram analyzer 1410 is configured to quantify the non-uniformity of the measured intensity histograms. To evaluate the uniformity of a histogram H, the analyzer 1410 utilizes a distance function that is an approximate measure of histogram non-uniformity, as shown in equation 8:

$$N(H) = \frac{1}{b}\sum_{k=I_{min}}^{I_{max}}\left[|H(k)| - \frac{|H|}{b}\right]^2 + \frac{\beta}{3}\sum_{n=1}^{3}\left[|H_n| - \frac{|H|}{3}\right]^2 \quad (8)$$

where $$|H_n| = \sum_{i=I_{min}+\frac{(n-1)b}{3}}^{I_{min}+\frac{nb}{3}-1}|H(i)|$$

where |H| represents the number of pixels recorded in H, |H(k)| denotes the number of pixels of intensity k, $|H_n|$ stands for the number of pixels in intensity range n, $I_{min}$ is the minimum intensity in H, $I_{max}$ is the maximum intensity in H, $b=I_{max}-I_{min}+1$ denotes the number of gray levels in H, and $\beta$ is an empirically fixed coefficient. $I_{max}$ and $I_{min}$ are set to exclude the gray levels and noise of the bounding regions and in this implementation, their range is set to be a multiple of 3 so that the three histogram ranges $H_n$ are equal. It is noted that other ranges may be set in other implementations. Transforming a histogram by an inverse response function leads to real-valued gray levels p.q, where p denotes the integer component and q the fractional component. These gray levels are distributed between two histogram bins such that |H(p)| is incremented by (1−q) and |H(p+1)| by q.

This measure combines the variance of two components: the number of elements in each gray level and the number of elements in each of three grayscale bins that each cover a third of the histogram range. While the first term quantifies unevenness among individual gray levels, the second term is a measure of unbalance among different sections of the distribution.

It is noted that equation 8 represents just one approach to evaluating uniformity of the measured intensity histogram. Other approaches may be used. For instance, one approach is to compute the so-called "Earth Movers Distance" with respect to an even distribution of a given number of samples in a given number of bins. This technique is described in Y. Rubner, C. Tomasi, and L. J. Guibas, A metric for distributions with applications to image databases, *In Proc. Int. Conf. on Comp. Vision*, pages 59-66, 1998. This alternative approach can be used as a more precise metric of histogram non-uniformity, but at a greater computational cost.

At block 1506, an inverse response function is determined from the histograms of the edge pixels obtained from the image. In one implementation, the inverse response generator 1402 computes the inverse response function that maps non-uniform histograms of measured intensities into uniform distributions of calibrated intensities.

Figure 16:
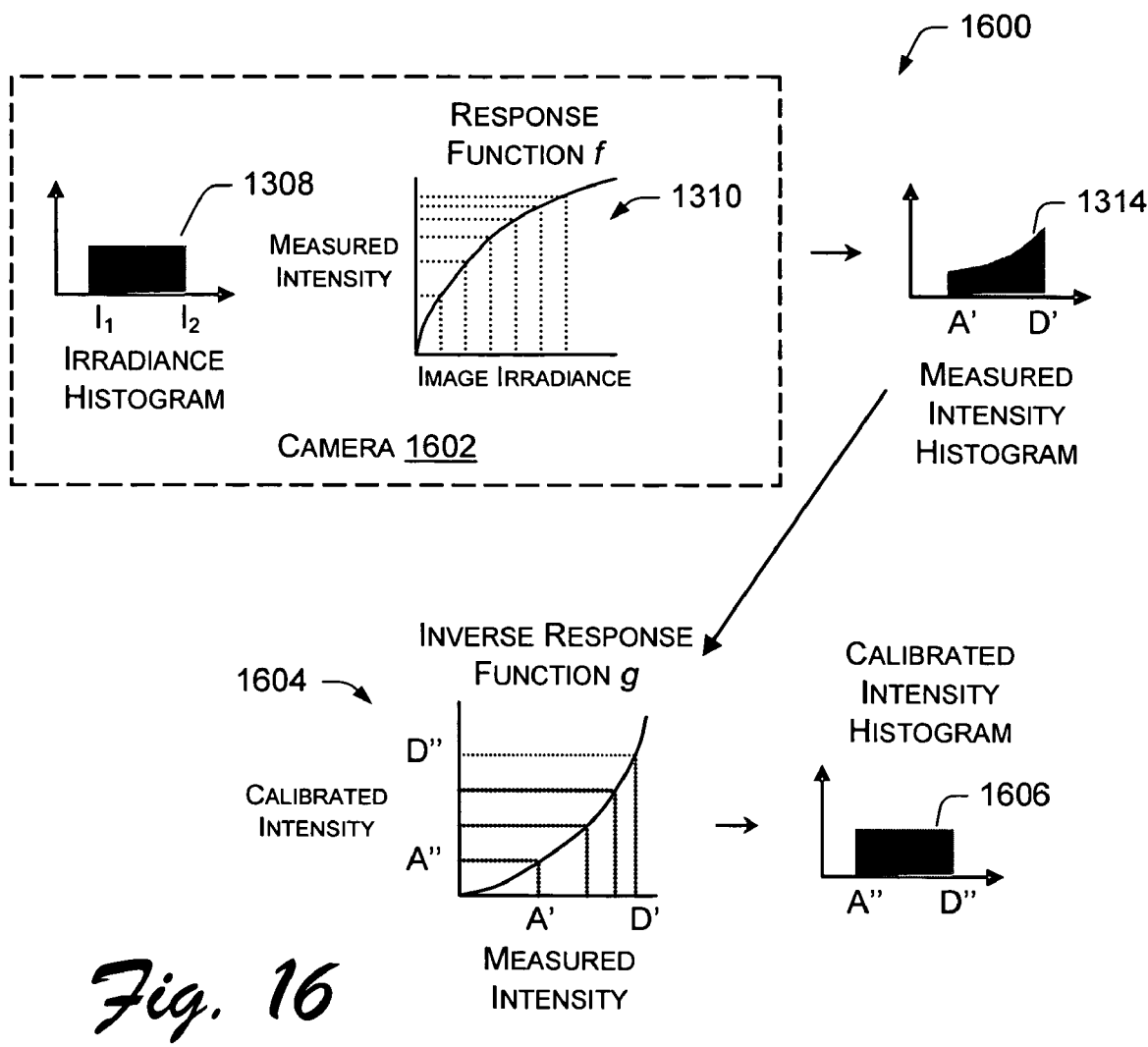
FIG. 16 is a conceptual illustration that demonstrates how the inverse response function for a single grayscale image is determined.

FIG. 16 shows a conceptual illustration 1600 that demonstrates how the inverse response function is determined. Recall from the discussion of FIG. 13, a uniform irradiance histogram 1308 is transformed by the camera's radiometric response function $f$ as represented by graph 1310, to nonlinearly map irradiance values to measured intensities. Due to the nonlinear function, a camera 1602 converts the irradiance values into intensity values that form in a measured intensity histogram 1314 with a non-uniform distribution.

From the measured intensity histogram 1314, an inverse response function g, as represented by graph 1604, is computed to transform the non-uniform histogram of measured intensities 1314 at an edge region into a uniform histogram of calibrated intensities 1606. In this manner, the composition of the inverse response function g with the response function $f$ yields calibrated intensity values g($f$(I)) that are linearly related to irradiance.

Figure 17:
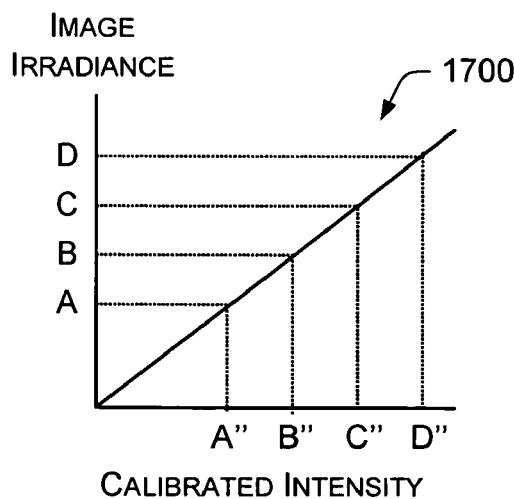
FIG. 17 illustrates a graph with a linear relationship between calibrated intensity values and the image irradiance that is yielded by the composition of the inverse response function determined in FIG. 16 and a response function of an image capture device.

FIG. 17 illustrates a graph 1700 exhibiting a linear relationship between the calibrated intensity values A″, B″, C″, and D″ and the image irradiance A, B. C, and D that is yielded by the composition of the inverse response function g and the response function $f$.

In one implementation, the inverse response function is computed from the histograms of multiple edge regions obtained from a single image. The benefits of using a larger number of edge regions are to cover a broader range of image intensity values and to reduce the influence of noise.

Figure 18:
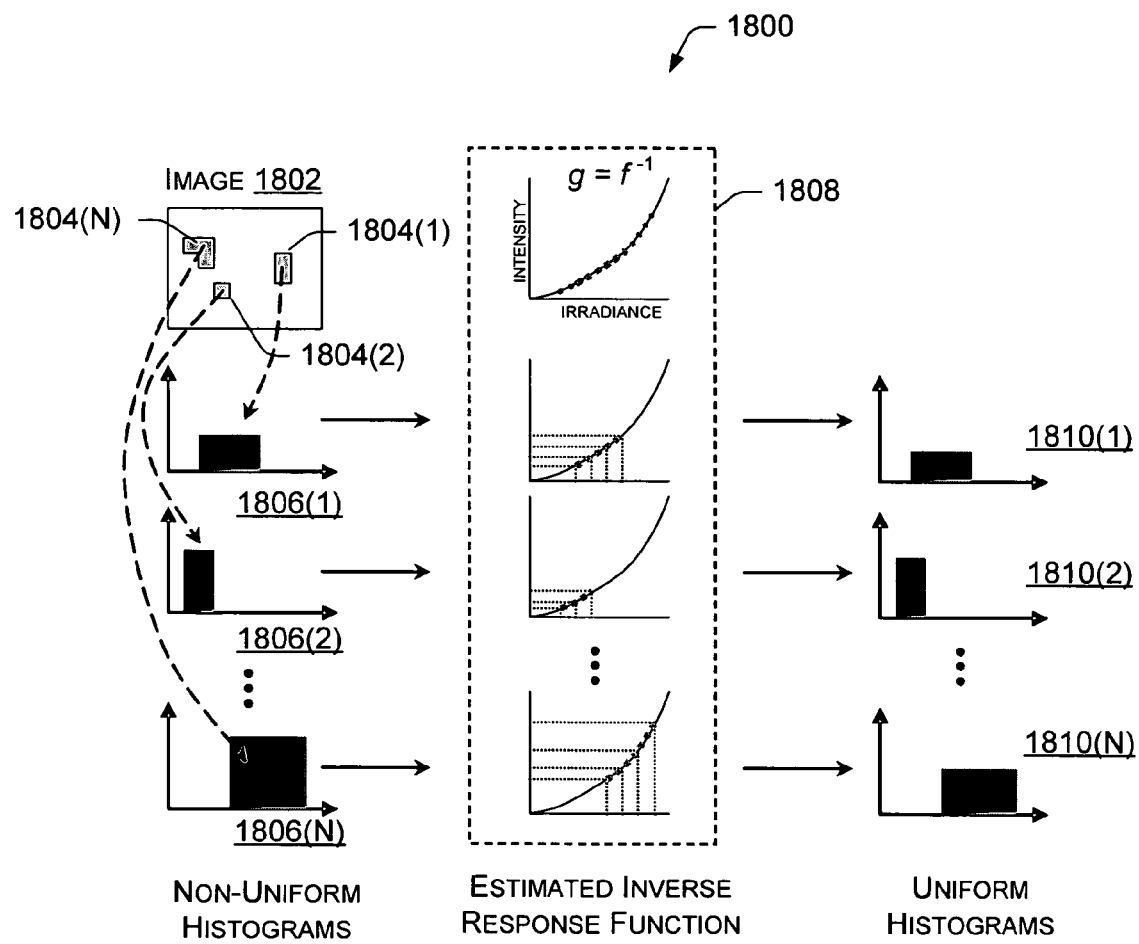
FIG. 18 is a conceptual illustration that demonstrates how the inverse response function is computed from multiple histograms of multiple edge regions.

FIG. 18 shows a conceptual illustration 1800 that demonstrates how the inverse response function is computed from the histograms of multiple edge regions. An image 1802 has multiple regions 1804(1), 1804(2), ..., 1804(N) with edge pixels identified by the edge pixel detector 1408. The irradiance values of each region is converted into intensity values with non-uniform histograms 1806(1), 1806(2), ..., 1806(N). Notice that the resultant histograms 1806 cover a broader range of image intensity values. An estimated inverse response function 1808 is then derived by mapping the non-uniform histograms 1806(1)-1806(N) for the multiple regions into corresponding uniform histograms of calibrated intensities 1810(1), 1810(2), ..., 1810(N).

One implementation of computing an inverse response function g from the histograms of multiple edge regions will now be described. For a given image, the intensity histograms of the edge regions are gathered into an observation set $\Omega$, and the total distance of a solution g is given by equation 9:

$$D(g; \Omega) = \sum_{H \in \Omega} w_H N(g(H)), \quad (9)$$

where $w_H = |H|/b$ is a coefficient that gives greater weight to more densely populated histograms that should have more statistically accurate distributions. A desired inverse response function g should yield the smallest total distance.

The accuracy of an inverse response function estimated from the distance function of equation 8 is limited by the amount of information present in $\Omega$, whose histograms may not fully span the range of possible intensity values. To accommodate missing data, physical characteristics of response functions (e.g., smoothness and monotonicity) could potentially be used to constrain the solution. In one implementation, inverse response generator 1412 uses principal components of the DoRF database 1414 (discussed above) to represent inverse response functions g, as described in $$g = g_0 + cH \quad (10)$$

where $g_0$ is the mean inverse response, H is the matrix whose columns are composed of the first N=5 eigenvectors, and c is an N-dimensional coefficient vector that represents an inverse response function g.

Additionally, in this implementation, inverse response generator 1412 may further employ prior data to regulate the distance function of equation 9 in a MAP estimation framework. A prior model p(g) of inverse response functions are formed from the DoRF database as a Gaussian mixture model, as given in equation 11:

$$p(g) = \sum_{i=1}^{K} \alpha_i N(g; \mu_i, \Sigma_i). \quad (11)$$

In this implementation, nine kernels (K=9) are used.

The inverse response function g should yield a low total distance as expressed in equation 9, the inverse response generator 1412 models a likelihood function p($\Omega$|g) by incorporating this distance measure into an exponential distribution, as given by equation 12:

$$p(\Omega | g) = \frac{1}{Z} \exp(-\lambda D(g; \Omega)) \quad (12)$$

where $\lambda$ is set empirically to $10^4$ and Z is a normalization constant.

For the observation set $\Omega$ of a given image, the MAP estimate of the response function g* can then be expressed in terms of the prior p(g) and the likelihood p($\Omega$|g), as given in equation 13:

$$g^* = \operatorname{argmax} p(g|\Omega) = \operatorname{argmax} p(\Omega|g) p(g). \quad (13)$$

By taking the log of p($\Omega$|g), g* can be written as given in equation 14:

$$g = \operatorname{argmin} E(g) = \operatorname{argmin} \lambda D(g; \Omega) - \log p(g), \quad (14)$$

where g* is the optimal solution of the objective function E(g).

An optimization may be computed by the Levenberg-Marquardt method (see e.g., Press, W. H., Teukolsky, S. A., Vetterling, W. T., Flannery, B. P., Numerical Recipes in C, Cambridge University Press, 1992), using nine initial values of g that correspond to the Gaussian centers $\mu_i$ of the GMM. Since g is represented by principal components in equation 10, the first and second derivatives of g(c) are approximated by the first and second differences with a small $\delta c$. After the optimization algorithm converges, the result is refined sequentially in each dimension using a greedy local search.

At block 1508 of FIG. 15, the inverse function is applied to calibrate the measured intensity values. Although the above operational flow is described sequentially in conjunction with FIG. 15, in other implementations, operations may be performed in different orders and/or in parallel.

In addition to the implementations described herein, other variations may be made. For instance, for a single grayscale image, one possible modification to obtain a broader range and greater quantity of histogram data is to more aggressively acquire edge regions, such as by allowing variation in window sizes and less restrictive selection thresholds. The amount of histogram data can also be increased by collecting edge regions from additional images captured by the same camera, even if the images are not registered or otherwise corresponded.

When the histograms of an image collectively span only a narrow range of intensities, the estimated inverse response function may have inaccuracies for gray levels outside this range. Within this range, calibrated intensities should nevertheless be linearly related to irradiance, since processed edges have uniform histograms. Because the valid range is known, it can be determined to which image areas this partial calibration can be applied. In some cases, the complete image or entire object of interest could consist of intensities within the valid range, resulting in sufficient calibration.

Besides the appearance of two regions in a pixel area, defocus and motion blur are other possible causes of irradiance blending at edges. For a given edge region, as long as the point spread function of such blur encompasses at most two different scene regions of uniform intensity, the blending will remain a linear combination of irradiances. The acceptance or rejection of a window with blur is resolved by the selection criteria described above.

Some cameras may employ certain post-processing operations, such as sharpening, which could alter the intensity distributions at edges. The above-described edge selection technique attempts to exclude anomalous histograms. To better ensure the rejection of invalid edge regions, identification of incongruous histograms could be enhanced by more precise rejection criteria, such as using the DoRF database to bound the space of valid intensity histograms. Another potential cue for discerning an outlier histogram is that its shape may not transform in concordance with other histograms that overlap it in grayscale range.

With the proposed statistical histogram measure for evaluating inverse response functions, radiometric calibration of grayscale images has been made possible in numerous instances where the camera is unknown. Although the techniques for single color images described above with reference to FIGS. 4-12 is not applicable to grayscale images, it is noted that the histogram approach described with reference to FIGS. 13-18 may conversely be used in individual RGB channels of color images.

Exemplary Computer Environment

The various implementations described above may be implemented in computer environments of the calibration system (e.g., system 202 of FIG. 2, system 402 of FIG. 4, and system 1402 of FIG. 14). An example computer environment suitable for use in a calibration system is described below in conjunction with FIG. 19.

Figure 19:
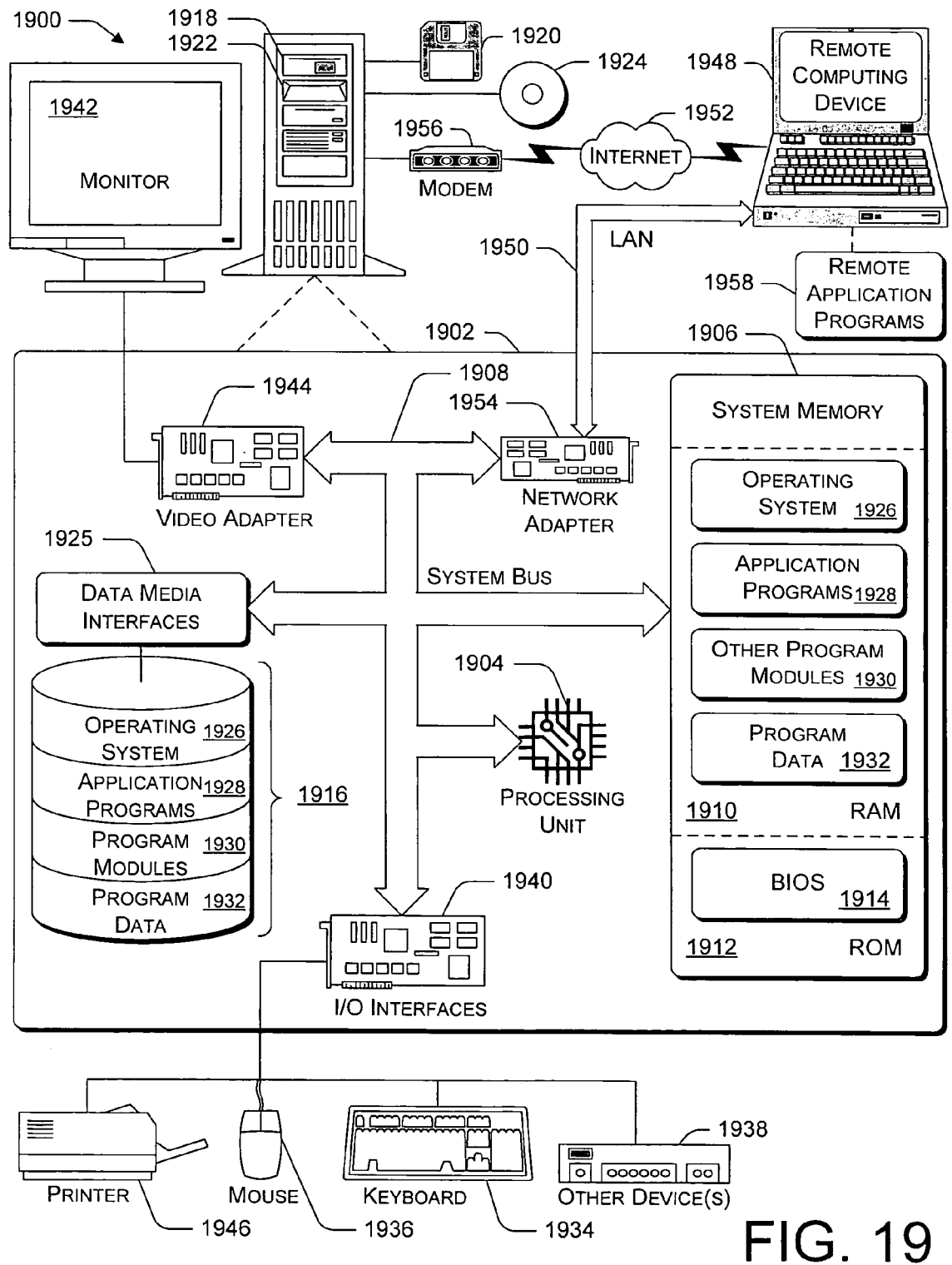
FIG. 19 is a block diagram illustrating an example computing environment suitable for practicing the above implementations.

FIG. 19 illustrates a general computer environment 1900, which can be used to implement the techniques and/or components described herein. The computer environment 1900 is only one example of a computing environment and is not intended to suggest any limitation as to the scope of use or functionality of the computer and network architectures. Neither should the computer environment 1900 be interpreted as having any dependency or requirement relating to any one or combination of components illustrated in the example computer environment 1900.

Computer environment 1900 includes a general-purpose computing device in the form of a computer 1902. The components of computer 1902 can include, but are not limited to, one or more processors or processing units 1904, system memory 1906, and system bus 1908 that couples various system components including processor 1904 to system memory 1906.

System bus 1908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Computer 1902 may include a variety of computer readable media. Such media can be any available media that is accessible by computer 1902 and includes both volatile and non-volatile media, removable and non-removable media.

System memory 1906 includes computer readable media in the form of volatile memory, such as random access memory (RAM) 1910; and/or non-volatile memory, such as read only memory (ROM) 1912 or flash RAM. Basic input/output system (BIOS) 1914, containing the basic routines that help to transfer information between elements within computer 1902, such as during start-up, is stored in ROM 1912 or flash RAM. RAM 1910 typically contains data and/or program modules that are immediately accessible to and/or presently operated on by processing unit 1904.

Computer 1902 may also include other removable/non-removable, volatile/non-volatile computer storage media. By way of example, FIG. 19 illustrates hard disk drive 1916 for reading from and writing to a non-removable, non-volatile magnetic media (not shown), magnetic disk drive 1918 for reading from and writing to removable, non-volatile magnetic disk 1920 (e.g., a "floppy disk"), and optical disk drive 1922 for reading from and/or writing to a removable, non-volatile optical disk 1924 such as a CD-ROM, DVD-ROM, or other optical media. Hard disk drive 1916, magnetic disk drive 1918, and optical disk drive 1922 are each connected to system bus 1908 by one or more data media interfaces 1925. Alternatively, hard disk drive 1916, magnetic disk drive 1918, and optical disk drive 1922 can be connected to the system bus 1908 by one or more interfaces (not shown).

The disk drives and their associated computer-readable media provide non-volatile storage of computer readable instructions, data structures, program modules, and other data for computer 1902. Although the example illustrates a hard disk 1916, removable magnetic disk 1920, and removable optical disk 1924, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1916, magnetic disk 1920, optical disk 1924, ROM 1912, and/or RAM 1910, including by way of example, operating system 1926, one or more application programs 1928, other program modules 1930, and program data 1932. Each of such operating system 1926, one or more application programs 1928, other program modules 1930, and program data 1932 (or some combination thereof) may implement all or part of the resident components that support the distributed file system.

A user can enter commands and information into computer 1902 via input devices such as keyboard 1934 and a pointing device 1936 (e.g., a "mouse"). Other input devices 1938 (not shown specifically) may include a microphone, joystick, game pad, satellite dish, serial port, scanner, and/or the like. These and other input devices are connected to processing unit 1904 via input/output interfaces 1940 that are coupled to system bus 1908, but may be connected by other interface and bus structures, such as a parallel port, game port, or a universal serial bus (USB).

Monitor 1942 or other type of display device can also be connected to the system bus 1908 via an interface, such as video adapter 1944. In addition to monitor 1942, other output peripheral devices can include components such as speakers (not shown) and printer 1946, which can be connected to computer 1902 via I/O interfaces 1940.

Computer 1902 can operate in a networked environment using logical connections to one or more remote computers, such as remote computing device 1948. By way of example, remote computing device 1948 can be a PC, portable computer, a server, a router, a network computer, a peer device or other common network node, and the like. Remote computing device 1948 is illustrated as a portable computer that can include many or all of the elements and features described herein relative to computer 1902. Alternatively, computer 1902 can operate in a non-networked environment as well.

Logical connections between computer 1902 and remote computer 1948 are depicted as a local area network (LAN) 1950 and a general wide area network (WAN) 1952. Such networking environments are commonplace in offices, enterprise-wide computer networks, intranets, and the Internet.

When implemented in a LAN networking environment, computer 1902 is connected to local network 1950 via network interface or adapter 1954. When implemented in a WAN networking environment, computer 1902 typically includes modem 1956 or other means for establishing communications over wide network 1952. Modem 1956, which can be internal or external to computer 1902, can be connected to system bus 1908 via I/O interfaces 1940 or other appropriate mechanisms. It is to be appreciated that the illustrated network connections are examples and that other means of establishing at least one communication link between computers 1902 and 1948 can be employed.

In a networked environment, such as that illustrated with computing environment 1900, program modules depicted relative to computer 1902, or portions thereof, may be stored in a remote memory storage device. By way of example, remote application programs 1958 reside on a memory device of remote computer 1948. For purposes of illustration, applications or programs and other executable program components such as the operating system are illustrated herein as discrete blocks, although it is recognized that such programs and components reside at various times in different storage components of computing device 1902, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various implementations.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one implementation," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for radiometric calibration, comprising:
    finding pixels in a single grayscale image, the pixels being located in edge regions that exhibit intensity blending between two gray levels wherein the finding comprises identifying non-overlapping, fixed-size image windows having predetermined characteristics;
    evaluating uniformity of histograms of measured intensities of the pixels in the edge regions; and
    determining an inverse response function that maps one or more non-uniform histograms into one or more corresponding uniform distributions.

2. A method as recited in claim 1, wherein the finding comprises rejecting certain edge regions having histograms that fail to exhibit predetermined characteristics.

3. A method as recited in claim 1, wherein the evaluating comprises computing a distance function as an approximate measure of histogram non-uniformity.

4. A method as recited in claim 1, wherein the evaluating comprises quantifying unevenness among individual gray levels and unbalance among different sections of the histogram.

5. A method as recited in claim 1, wherein the determining comprises computing the inverse response function from histograms of multiple edge regions obtained from a single grayscale image.

6. A method as recited in claim 1, wherein the determining comprises using reference inverse response data collected from multiple image capture devices.

7. A method as recited in claim 1, further comprising applying the inverse response function to calibrate the measured intensities.

8. A computer-readable medium storing computer-executable instructions that, when executed, perform the method as recited in claim 1.

* * * * *